United States Patent [19]
Marmonier

[11] Patent Number: 5,436,797
[45] Date of Patent: Jul. 25, 1995

[54] MODULAR STATION OF THE METAL-CLAD TYPE AND OF REDUCED SIZE, WITH A SHORTENED SET OF BUSBARS

[75] Inventor: Jean Marmonier, Aix les Bains, France

[73] Assignee: GEC Alsthom T & D SA, Paris, France

[21] Appl. No.: 118,596

[22] Filed: Sep. 10, 1993

[30] Foreign Application Priority Data

Sep. 11, 1992 [FR] France ............... 92 10857

[51] Int. Cl.6 .................................. H02B 5/00
[52] U.S. Cl. ........................ 361/602; 361/611; 218/68
[58] Field of Search ............ 361/601, 602, 604, 605, 361/606–611, 829, 837; 200/48 R, 148 R, 148 B

[56] References Cited

U.S. PATENT DOCUMENTS

| | | | |
|---|---|---|---|
| 3,787,711 | 1/1974 | Bright | 174/37 |
| 5,126,917 | 6/1992 | Matsuda | 361/333 |
| 5,175,667 | 12/1992 | Kondo | 361/333 |
| 5,200,881 | 4/1993 | Itai | 361/604 |
| 5,216,574 | 6/1993 | Marmonier | 361/335 |

FOREIGN PATENT DOCUMENTS

| | | |
|---|---|---|
| 0093687 | 4/1983 | European Pat. Off. . |
| 2435843 | 4/1980 | France . |
| 2458160 | 12/1980 | France . |

OTHER PUBLICATIONS

Japanese Patent Abstract 53 015 541 dated Feb. 13, 1978—(as understood—copy not clear).

*Primary Examiner*—Gerald P. Tolin
*Attorney, Agent, or Firm*—Sughrue, Mion, Zinn, Macpeak & Seas

[57] ABSTRACT

A metal-clad modular power-supply station comprising a main set of busbars interconnecting at least two pairs of components, such as overhead feedthroughs or cable boxes, in an H-station configuration. The components are connected together in pairs by respective rectilinear groups of metal-clad electrical apparatuses that are parallel to and connected to the main set of busbars. Preferably, the groups of electrical apparatuses are in alignment. The length of the set of busbars is thus reduced while complying with the laid-down isolation distances and a station is provided of minimum size and of reduced cost.

6 Claims, 3 Drawing Sheets

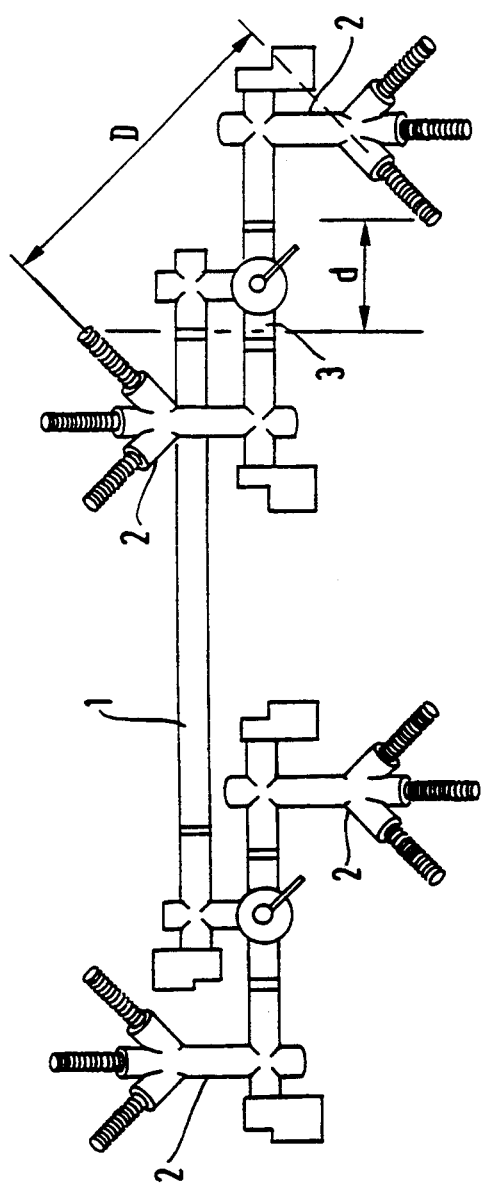
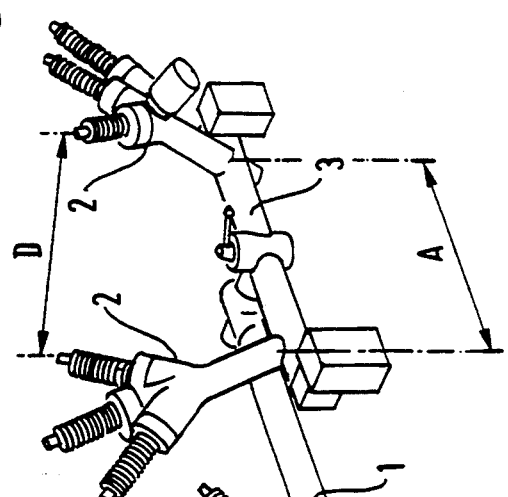
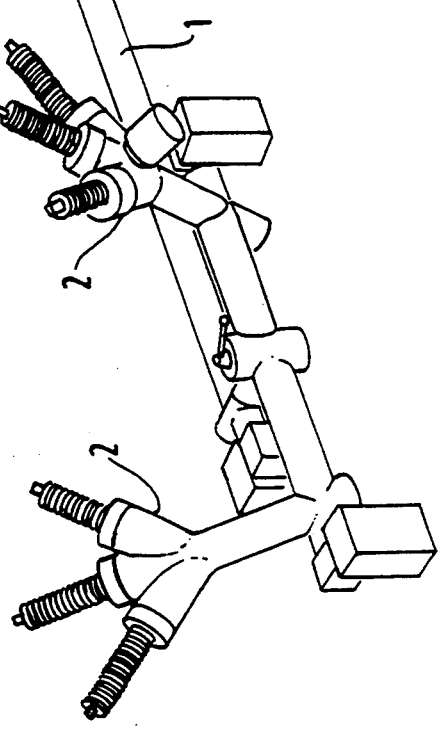
FIG.6
FIG.7

MODULAR STATION OF THE METAL-CLAD TYPE AND OF REDUCED SIZE, WITH A SHORTENED SET OF BUSBARS

The present invention relates to a modular station of the metal-clad type of reduced size, with a shortened set of busbars.

BACKGROUND OF THE INVENTION

More exactly, the invention relates to a metal-clad modular electricity supply station including a main set of busbars interconnecting at least two pairs of components, such as overhead feedthroughs or cable boxes, in an H-station configuration.

In general, such pairs of components are disposed on the same side of the main set of busbars and are connected thereto. The main set of busbars is thus relatively long given the isolation distances laid down for electrical and safety reasons. For example, with overhead feedthroughs at a voltage of 72.5 kV, the isolation distance is about 5 meters.

OBJECT AND SUMMARY OF THE INVENTION

The object of the invention is to reduce the length of the set of busbars while still complying with the laid-down isolation distances, thereby providing a station of minimum size and of reduced cost.

To do this, according to the invention, the components are connected together in pairs by respective rectilinear groups of metal-clad electrical apparatuses that are parallel to and connected to the main set of busbars.

With this novel architecture, the length of the main set of busbars is reduced by about one-fourth, as is demonstrated in the description below.

Advantageously, the groups of electrical apparatuses are in alignment. In which case, the station is symmetrical and does not require a busbar link between each pair and the main set of busbars.

In a preferred embodiment, the components are overhead feedthroughs that are inclined in alternating manner on either side of the vertical plane containing their bases.

In this way, any set of busbars, whether a set between feedthroughs or the main set, is optimally shortened since the inclination increases the distance between the heads of the feedthroughs, thereby making it possible to reduce the spacing between their bases, as is demonstrated below.

BRIEF DESCRIPTION OF THE DRAWINGS

The invention is described in greater detail below with reference to the drawings that merely show a preferred embodiment thereof.

FIG. 6 is a plan view of a station in accordance with the invention.

FIG. 7 is a perspective view of a station in accordance with the invention.

MORE DETAILED DESCRIPTION

Figure 1:
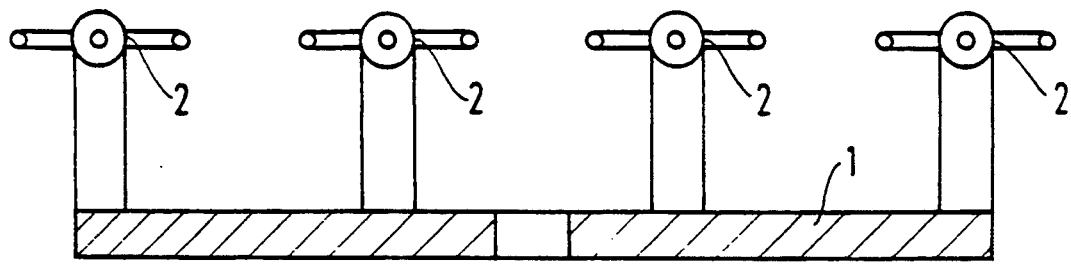
FIG. 1 is a diagrammatic plan view of a prior art station.
Figure 2:
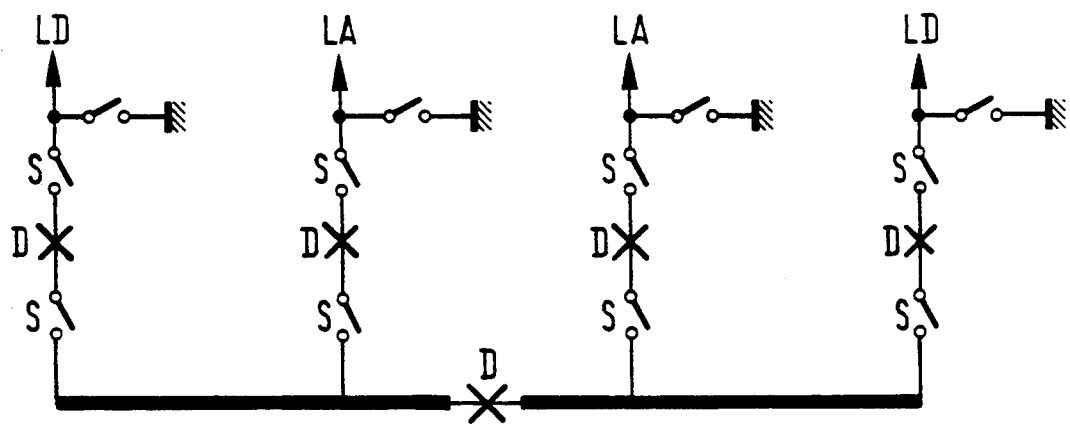
FIG. 2 is the electrical circuit diagram of that station.

FIG. 1 shows a commonly used configuration and FIG. 2 is the corresponding electrical circuit diagram. The components 2, in this case overhead feedthroughs, are all disposed on the same side of a main set of busbars 1. Whether a line is an incoming line LA or an outgoing line LD, each circuit branch connecting a line to the set of busbars 1 includes a grounding switch, a first section switch S, a circuit breaker D, and a second section switch S. The set of busbars 1 includes its own circuit breaker D.

Since the minimum distance between overhead feedthroughs is laid down, the length of the set of busbars is defined and is represented by shading in FIG. 1.

Figure 3:
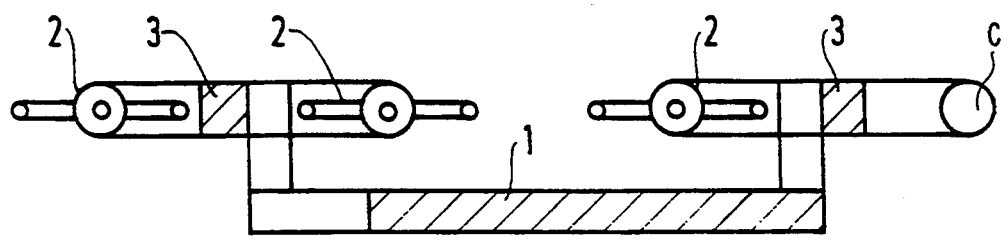
FIG. 3 is a diagrammatic plan view of a station in accordance with the invention.
Figure 4:
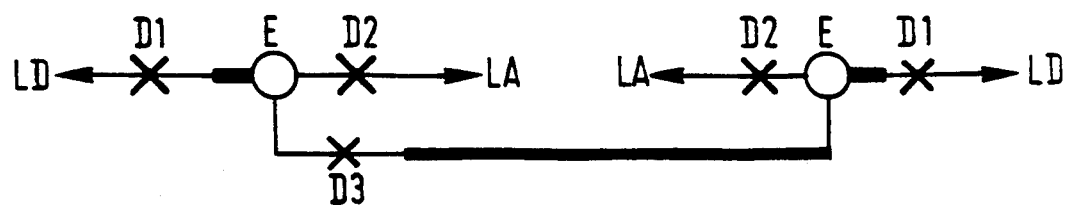
FIG. 4 is the electrical circuit diagram of that station.

FIG. 3 shows an H-station in accordance with the invention and FIG. 4 is the corresponding electrical circuit diagram.

The feedthroughs 2 are connected together in pairs by a rectilinear group 3 of metal-clad electrical apparatuses that are parallel to and connected to the main set of busbars 1. The groups of apparatuses 3 are preferably in alignment. Each group 3 interconnects an incoming line LA and an outgoing line LD, and it comprises a first circuit breaker D1, a component E designed to achieve the equivalent of three three-phase section switches with a grounding option, e.g. as described in the Applicants' French patent application No. 91 09 282, filed Jul. 23, 1991, and a second circuit breaker D2. The main set of busbars 1 also includes a circuit breaker D3. An H electrical circuit is thus obtained.

The lengths that are necessary for the sets of busbars are represented in FIG. 3 by shading and by virtue of this novel architecture they are considerably shorter than the prior art, in spite of the need to have busbars in the groups of apparatus 3 in order to satisfy the laid-down minimum distance between feedthroughs 2.

Figure 5:
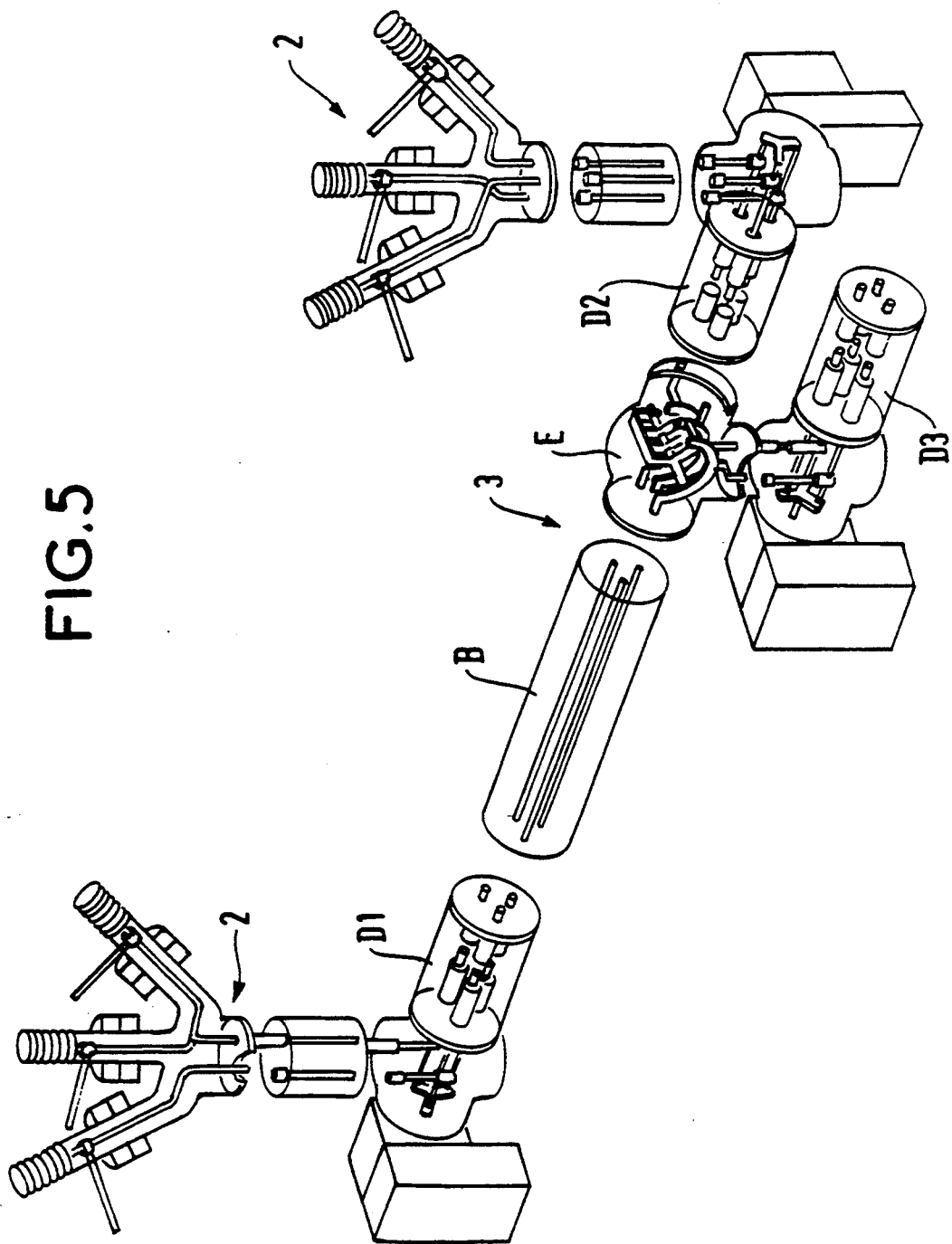
FIG. 5 is a fragmentary exploded view of a station in accordance with the invention.

FIG. 5 shows a fragment of such a station in greater detail.

The feedthroughs 2 in the same pair of feedthroughs are interconnected via the first circuit breaker D1, a set of busbars B, the component E, and the second circuit breaker D2. The circuit breaker D3 of the main set of busbars is connected to the component E.

This architecture is equally suitable for use with components 2 constituted by overhead feedthroughs as described or with components constituted by cable boxes (see FIG. 3).

By virtue of another characteristic, it is possible to further reduce the length of the set of busbars required, in particular when using overhead feedthroughs.

FIGS. 6 and 7 show the preferred embodiment of the invention.

The overhead feedthroughs 2 are inclined in alternating manner to opposite sides of the vertical plane containing their bases, and the inclination is preferably at an angle of about 30°. Thus, the distance A between the bases of the feedthroughs 2 is reduced by (D-d) given the increase in spacing obtained between the feedthroughs 2. It is thus possible to further shorten both the main set of busbars and the sets of busbars contained in the groups of apparatus 3, thereby achieving overall shortening of the station by a ratio of about $\frac{1}{3}$.

In addition to its reduced cost, the compactness of such a station presents numerous advantages. In particular, it reduces difficulties in transport and in installation.

I claim:

1. A metal-clad modular power-supply station in an electrical circuit having an H-station configuration comprising a main set of busbars interconnecting at least two pairs of high-voltage interfaces comprising at least three overhead feedthroughs which are connected together in pairs by respective rectilinear groups of metal-clad electrical apparatuses, each pair of high-voltage interfaces comprising an incoming line and an outgoing line and each group of apparatuses comprising an arrangement of circuit breakers and section switches, wherein the groups of apparatuses are parallel to and connected to the main set of busbars.

2. A station according to claim 1, wherein the groups of metal-clad electrical apparatuses are in alignment.

3. A station according to claim 2, wherein the overhead feedthroughs are inclined in an alternating manner on either side of a vertical plane containing their bases.

4. A station according to claim 1, wherein the groups of metal-clad electrical apparatuses comprise a first circuit breaker, a switching component equivalent of three three-phase section switches and a second circuit breaker.

5. A station according to claim 2, wherein the groups of metal-clad electrical apparatuses comprise a first circuit breaker, a switching component equivalent of three three-phase section switches and a second circuit breaker.

6. A station according to claim 3, wherein the groups of metal-clad electrical apparatuses comprise a first circuit breaker, a switching component equivalent of three three-phase section switches and a second circuit breaker.

* * * * *